(12) United States Patent
Enomoto

(10) Patent No.: US 7,957,890 B2
(45) Date of Patent: Jun. 7, 2011

(54) VALVE CONTROL DEVICE AND METHOD FOR INTERNAL COMBUSTION ENGINE

(75) Inventor: Hiroshi Enomoto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 804 days.

(21) Appl. No.: 11/989,317

(22) PCT Filed: Jul. 21, 2006

(86) PCT No.: PCT/JP2006/314928
§ 371 (c)(1),
(2), (4) Date: Jan. 24, 2008

(87) PCT Pub. No.: WO2007/013569
PCT Pub. Date: Feb. 1, 2007

(65) Prior Publication Data
US 2009/0265084 A1  Oct. 22, 2009

(30) Foreign Application Priority Data

Jul. 25, 2005 (JP) .................... 2005-214561

(51) Int. Cl.
*G06F 19/00* (2006.01)

(52) U.S. Cl. .............. 701/112; 701/103; 123/568.16; 123/399

(58) Field of Classification Search .......... 701/101–103, 701/105–107, 110, 112, 114, 115; 123/336, 123/337, 361, 396, 399, 403, 478, 408, 568–16
See application file for complete search history.

(56) References Cited

U.S. PATENT DOCUMENTS

| | | | | |
|---|---|---|---|---|
| 4,696,323 A | * | 9/1987 | Iff | 137/375 |
| 5,540,414 A | * | 7/1996 | Giordani et al. | 251/174 |
| 5,634,486 A | * | 6/1997 | Hatting et al. | 137/315.01 |
| 7,080,822 B2 | * | 7/2006 | Tulaskar | 251/315.01 |
| 7,168,682 B2 | * | 1/2007 | Nanba et al. | 251/305 |
| 2005/0183705 A1 | * | 8/2005 | Nanba et al. | 123/568.24 |
| 2006/0243243 A1 | * | 11/2006 | Fukasawa | 123/299 |

FOREIGN PATENT DOCUMENTS

| | | |
|---|---|---|
| JP | 7-293355 | 11/1995 |
| JP | 8-326607 | 12/1996 |

(Continued)

OTHER PUBLICATIONS

International Search Report dated Oct. 31, 2006.

(Continued)

*Primary Examiner* — Stephen K Cronin
*Assistant Examiner* — Johnny H Hoang
(74) *Attorney, Agent, or Firm* — Finnegan, Henderson, Farabow, Garrett & Dunner, LLP

(57) ABSTRACT

A valve control device performs control for eliminating or preventing fixation of an EGR valve (30) by opening/closing the valve near its fully closed position. After an engine stops, the valve control device performs "a fixation avoiding operation" for opening/closing EGR valve (30) near the fully closed position, and further, performs "a fixation determining operation". When it is determined that the fixation of EGR valve (30) is eliminated, EGR valve (30) is positioned at the fully closed position, and a reference position is corrected such that the fully closed position is regarded as a reference position at which a valve opening/closing control is performed during the operation of the engine.

16 Claims, 9 Drawing Sheets

| | FOREIGN PATENT DOCUMENTS | |
|---|---|---|
| JP | 2000-320347 | 11/2000 |
| JP | 2001-173464 | 6/2001 |
| JP | 2002-161750 | 6/2002 |
| JP | 2004-84492 | 3/2004 |
| JP | 2004-162665 | 6/2004 |
| JP | 2004-316559 | 11/2004 |

OTHER PUBLICATIONS

Abstract of PCT International Publication No. WO 02/14673 A1.
Abstract of European Patent Application No. EP 1 310 660 A1.
Abstract of European Patent Application No. EP 1 420 158 A2.
Abstract of European Patent Application No. EP 1 394 400 A1.

* cited by examiner

VALVE CONTROL DEVICE AND METHOD FOR INTERNAL COMBUSTION ENGINE

TECHNICAL FIELD

The present invention relates to a valve control device provided in an internal combustion engine (hereinafter also referred to as "an engine") mounted on an automobile or the like. In particular, the present invention relates to an improvement in operation to be performed in order to eliminate or prevent any fixation of a valve caused by deposits or the like.

BACKGROUND ART

An engine for an automobile, for example, has been conventionally provided with an exhaust gas recirculation apparatus, in which a part of exhaust gas flowing in an exhaust pipe is introduced, as exhaust gas recirculation gas (i.e., "EGR gas"), into an intake pipe, and an in-cylinder maximum combustion temperature is decreased by mixing the EGR gas with intake air, thereby reducing harmful substance (e.g., nitrogen oxide) contained in the exhaust gas.

Such an exhaust gas recirculation apparatus includes an EGR piping for connecting an exhaust system and an intake system to each other in an engine, and an EGR valve housed inside of the EGR piping with an opening position thereof being adjustable. That is to say, a free wheel quantity of the EGR gas is adjusted by adjusting the opening position of the EGR valve.

In the exhaust gas recirculation apparatus of this type, deposits of a combustion product (such as oxide or carbide) contained in the EGR gas may be possibly produced in the EGR piping, for example, an exhaust gas free wheel channel formed inside of a circularly cylindrical nozzle fitted into a valve housing. Such deposits are caused by hydrocarbon (abbreviated as "HC"), carbon (abbreviated as "C"), or oil contained in the exhaust gas, and unfavorably adhere onto the outer periphery of the EGR valve, a drive shaft of the EGR valve and an inner wall of the exhaust gas free wheel channel, and the like due to the high viscosity. In the case where the deposits (i.e., sediments) adhere between the outer periphery of the EGR valve and the inner wall of the free wheel channel or between the drive shaft and the inner wall of the free wheel channel, opening/closing operations of the EGR valve is prevented, thereby raising problems of an impossibility of favorable adjustment of an opening position of the EGR valve, an impossibility of supply of the EGR gas into the intake pipe, an impossibility of achievement of a proper free wheel quantity of the EGR gas, and the like. Particularly, the above-described inconveniences conspicuously occur in the case where a drive torque for opening/closing the EGR valve is small or the opening position of the EGR valve is to be controlled within a finely angular range.

In order to solve the above-described problems, Patent Document 1 (i.e., Japanese Patent Laying-Open No. 2004-162665) has been proposed. Patent Document 1 discloses that an EGR valve is opened/closed by a predetermined opening position near a valve fully closed position while an engine stops (hereinafter this operation is referred to as "a valve reciprocating motion control operation"). As a consequence, adhering deposits are scraped by the EGR valve, thus eliminating or preventing any fixation of the EGR valve.

Otherwise, Patent Document 2 (i.e., Japanese Patent Laying-Open No. 2000-320347) discloses a reciprocating motion of a throttle valve within a predetermined range including the front and back of a fully closed position of the throttle valve in an operation for eliminating the fixation of the throttle valve caused by deposits. In other words, Patent Document 2 discloses "a valve reciprocating motion control operation" directed to the throttle valve.

However, neither of Patent Document 1 and 2, described above, consider the case where the deposits cannot be scraped even by "the valve reciprocating motion control operation" due to the strong fixation of the valve caused by the deposits, thereby raising problems, as follows:

Namely, the valve reciprocating motion control operation disclosed in Patent Document 1 is designed to be continued until a maximum current value of a motor current to be supplied to a drive motor is decreased down to a predetermined current value or lower. However, in a situation in which the maximum current value of the motor current is not decreased down to the predetermined current value or lower due to the strong fixation of the valve, the drive motor is unfavorably continued to be electrified, thereby making it difficult to shorten a time required for the control operation, achieve high efficiency and save power consumption.

In the meantime, the valve reciprocating motion control operation disclosed in Patent Document 2 is designed to first supply a drive current to a direct-acting torque motor in such a manner as to open a valve from a valve opening position at 0° (i.e., a fully closed position) to a valve opening position at 3° on a plus side. Here, in a situation in which the valve cannot be opened up to the position at 3° due to the strong fixation of the valve, the drive current is unfavorably continued to be supplied to the direct-acting torque motor. Also in this situation, the valve reciprocating motion control operation is continued for a long period of time, thereby making it difficult to shorten a time required for the control operation, achieve high efficiency and save power consumption.

DISCLOSURE OF THE INVENTION

The present invention has been accomplished in view of the above-described situations. An object of the present invention is to provide a valve control device for an internal combustion engine, in which the valve control device performs a control operation for eliminating or preventing any fixation of a valve by opening/closing the valve near a valve fully closed position, thus making it possible to shorten a time required for the control operation, achieve high efficiency and save power consumption.

Problem Solving Principle

Solving means according to the present invention devised to achieve the above-described object is to limit each of a drive time required for moving a valve in one direction and a drive time required for moving the valve in the other direction, switch a valve movement direction in accordance with the limited time, and complete moving operations predetermined times within a predetermined period of time.

Solving Means

Specifically, the present invention assumes that a valve control device for an internal combustion engine provided with a valve disposed on a gas pipe (an EGR pipe or an intake path) in the internal combustion engine and allowing variation in flow rate of gas flowing in the pipe by opening/closing operations, and a valve actuating unit for performing "a fixation avoiding operation" for eliminating or preventing any fixation of the valve by opening/closing motions of the valve by a movement quantity for eliminating the fixation in one or the other direction near a valve fully closed position. In the valve control device for the internal combustion engine, the valve actuating unit is configured such that the valve actuating unit starts an operation for moving the valve in the one direction during "the fixation avoiding operation", starts an operation for moving the valve in the other direction when a valve movement quantity does not reach the movement quantity for eliminating the fixation even after a lapse of a predetermined movement control time and starts the operation for moving the valve in one direction when the valve movement quantity does not reach the movement quantity for eliminating the fixation even after the lapse of the predetermined movement control time during the operation for moving the valve in the other direction, and finishes "the fixation avoiding operation" after the operations for moving the valve in one direction and in the other direction are performed predetermined times.

With this specified matter, when "the fixation avoiding operation" is started, the valve is first started to be moved in one direction from the vicinity of the fully closed position. For example, the valve is started to be moved in one direction by electrifying the drive motor for opening/closing the valve. After the start of this operation, when the valve movement quantity does not reach the fixation elimination movement quantity even after a lapse of a predetermined movement control time, that is, when the valve cannot be smoothly moved in one direction due to the strong fixation of the valve with the deposits or the like (i.e., the valve cannot reach a predetermined opening position), the operation is stopped, and the movement direction of the valve is switched. In other words, the valve is started to be moved in the other direction. In the same manner, after the valve is started to be moved in the other direction, when the valve movement quantity does not reach the fixation elimination movement quantity even after the lapse of the predetermined movement control time, that is, when the valve cannot be smoothly moved in the other direction, either, due to the strong fixation of the valve still with the deposits or the like (i.e., the valve cannot reach a predetermined opening position), the operation is stopped, and the movement direction of the valve is switched again. In other words, the valve is started to be moved in one direction. The above-described operations are performed predetermined times, thereby completing "the fixation avoiding operation". In this manner, according to the present solving means, in a situation in which the valve cannot be smoothly moved due to the strong fixation of the valve with the deposits, the movement direction of the valve is switched after the lapse of the predetermined time (i.e., after the lapse of the predetermined movement control time), thereby completing "the fixation avoiding operation" after the valve moving operations performed the predetermined times. Consequently, it is possible to prevent any occurrence of a situation in which the operation for moving the valve in one or the other direction is continued for a long period of time, so as to complete "the fixation avoiding operation" in a relatively short period of time. As a result, a time required for "the fixation avoiding operation" can be shortened, thus enhancing the efficiency of the operation and saving power consumption. Also when it is determined as to whether or not the valve is fixed in "the fixation avoiding operation", the determination can be accurately made in a short time.

Incidentally, according to the present solving means, it is determined that the fixation of the valve with the deposits or the like is eliminated or no fixation occurs from the beginning in the case where the valve movement quantity reaches the movement quantity for eliminating the fixation before a lapse of a predetermined movement control time after the start of the operation for moving the valve in one direction or the operation for moving the valve in the other direction (that is, the valve reaches the predetermined opening position). The valve movement direction is switched at the time when the valve movement quantity reaches the fixation elimination movement quantity. At this time, "the fixation avoiding operation" may be completed.

Specific configurations in determining as to whether or not the valve is fixed in "the fixation avoiding operation" include the following. There is provided a fixation determiner for determining as to whether or not "the fixation avoiding operation" can eliminate the fixation of the valve. Furthermore, the fixation determiner determines that the fixation of the valve is eliminated in the case where the valve movement quantity reaches the movement quantity for eliminating the fixation within a predetermined movement control time after the start of the operation for moving the valve in one direction or the operation for moving the valve in the other direction.

Moreover, the fixation determiner determines that the fixation of the valve is not eliminated in the case where the valve movement quantity does not reach the movement quantity for eliminating the fixation more than predetermined times even after a lapse of a predetermined movement control time after the start of the operation for moving the valve in one direction and the operation for moving the valve in the other direction are performed the predetermined times.

With these specified matters, an operation for determining as to whether or not the valve is fixed (i.e., a fixation determining operation) can be performed together with "the fixation avoiding operation". As described above, "the fixation avoiding operation" is completed in the relatively short time, and therefore, the fixation of the valve determined by the fixation determining operation can be determined in a relatively short time. Furthermore, the valve is moved in one or the other direction the predetermined times in "the fixation avoiding operation", thus achieving the high reliability of the determination of the fixation.

Specific operations of the internal combustion engine in accordance with the result of the determination of the fixation by the fixation determiner include: namely, prohibiting opening/closing operations of the valve during the operation of the internal combustion engine in the case where the fixation determiner determines that the fixation of the valve is not eliminated.

Additionally, the valve opened/closed position is set at a predetermined position in the case where the fixation determiner determines that the fixation of the valve is eliminated, and a reference position correcting operation is performed for recognizing the predetermined position as a reference position, at which the valve opening/closing control operation is performed during the operation of the internal combustion engine.

In the case of prohibiting opening/closing operations of the valve when it is determined that the fixation of the valve is not eliminated, it is possible to avoid any breakage of the valve caused by a forcible operation of the fixed valve.

In contrast, in the case where the reference position in performing the valve opening/closing control operation is corrected when it is determined that the fixation of the valve is eliminated, the reference position can be corrected in the situation in which the valve can be accurately positioned at a predetermined reference position (e.g., the valve fully closed position), thus controlling the opening position of the valve during the operation of the internal combustion engine with a high accuracy, so as to favorably perform the operation of the internal combustion engine. For example, an EGR gas free wheel quantity can be controlled with a high accuracy when a valve reference position of an EGR valve is corrected by employing the present solving means as a control device for the EGR valve. Otherwise, an intake air quantity can be controlled with a high accuracy when a valve reference position of a throttle valve is corrected by employing the present solving means as a control device for the throttle valve.

Additionally, "the fixation avoiding operation" is designed to be performed while the internal combustion engine stops. As a consequence, "the fixation avoiding operation" or "the fixation determining operation" can be performed while avoiding an adverse influence (e.g., degradation of emission) caused by a valve opening/closing operation different from an inherent valve opening/closing control operation during the operation of the internal combustion engine.

According to the present invention, the valve is started to be moved in the other direction when the valve movement quantity does not reach the predetermined quantity even after the lapse of the predetermined movement control time during the reciprocating motion in order to avoid the fixation of the valve. Thus, it is possible to prevent any occurrence of a situation in which the operation for moving the valve in one or the other direction is continued for a long period of time, so as to complete "the fixation avoiding operation" in the relatively short time. As a result, the time required for "the fixation avoiding operation" can be shortened, thus enhancing the efficiency of the operation and saving the power consumption.

BRIEF DESCRIPTION OF THE DRAWINGS

FIG. 7 is a timing chart illustrating the changes in timer value of the drive timer, count value of the drive counter and count value of the fixation counter in a situation in which the fixation flag is set to ON.

BEST MODES FOR CARRYING OUT THE INVENTION

Referring to the attached drawings, modes for carrying out the present invention will be described below. The present preferred embodiment is exemplified by a control device for an EGR valve in a common rail type in-cylinder direct-injection multi-cylinder (e.g., 4-cylinder) diesel engine mounted on an automobile, to which the present invention is applied.
—Explanation of Configuration of Engine—

Figure 1:
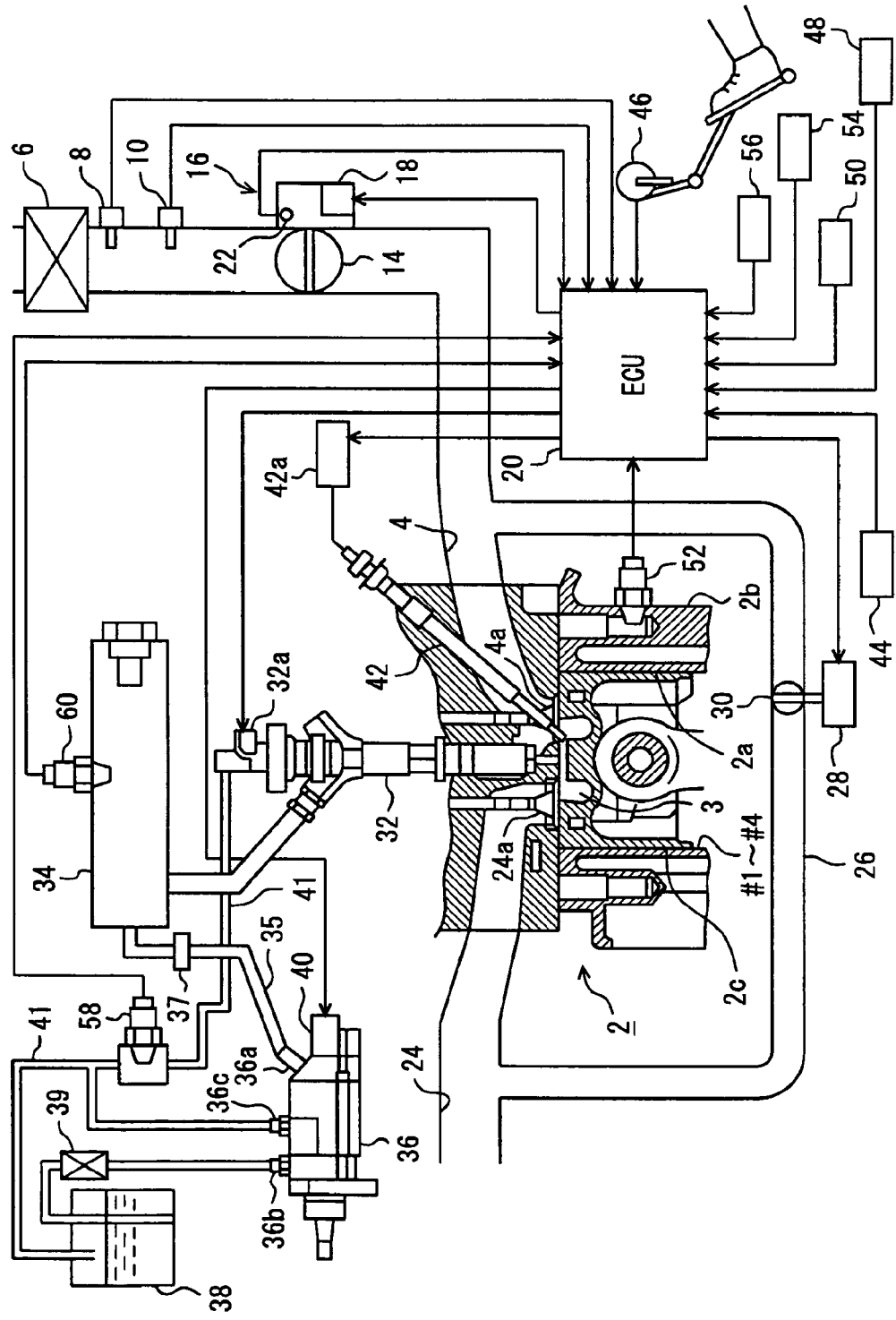
FIG. 1 is a diagram schematically illustrating the configuration of an engine and a control system in a preferred embodiment according to the present invention.

First of all, explanation will be made on the schematic configuration of a diesel engine (hereinafter simply referred to as "an engine") in the present preferred embodiment. FIG. 1 is a diagram schematically illustrating the configuration of an engine 2 and a control system in the present preferred embodiment.

To a combustion chamber 3 defined between a cylinder 2a and a piston 2c in engine 2 is connected an intake path 4 via an intake valve 4a as an intake system. In intake path 4, there are provided an air cleaner 6 for filtering intake air, an intake air quantity sensor 8 for detecting an intake air quantity GN, an intake air temperature sensor 10 for detecting an intake air temperature, and a throttle valve 14 for adjusting the intake air quantity to be introduced into combustion chamber 3 in order from the upstream.

Throttle valve 14 is driven to be opened/closed by a drive mechanism 16. Drive mechanism 16 is constituted by including a stepping motor 18 and a group of gears for driveably connecting stepping motor 18 and throttle valve 14. Here, stepping motor 18 is driveably controlled by an electronic control unit (hereinafter abbreviated as "an ECU") 20 for performing various kinds of controls of engine 2. Furthermore, drive mechanism 16 includes a fully opening switch 22 which is turned on when throttle valve 14 is located at a fully opening position.

In the meantime, to combustion chamber 3 is connected, as an exhaust system, an exhaust path 24 via an exhaust valve 24a. From exhaust path 24 is branched an EGR (abbreviating "exhaust gas recirculation") pipe 26. EGR pipe 26 is connected downstream of throttle valve 14 on intake path 4. On EGR pipe 26 is disposed an EGR valve 30 to be driveably opened/closed by an actuator 28 controlled by ECU 20. The configuration and actuation of each of actuator 28 and EGR valve 30 will be described later. The ratio between an intake air quantity and an EGR quantity to be introduced into combustion chamber 3 can be freely set by adjusting the intake air quantity and the EGR quantity by throttle valve 14 and EGR valve 30, respectively. As a consequence, the intake air quantity and the EGR quantity can be properly controlled in all of operating regions of engine 2.

Engine 2 includes a plurality of cylinders (only one cylinder is shown, although there are four cylinders in the present preferred embodiment) #1, #2, #3 and #4, each having an injector 32 with respect to combustion chamber 3 thereof. Fuel injection from injector 32 to each of cylinders #1 to #4 in engine 2 is controlled by turning on or off an injection controlling solenoid valve 32a.

Injector 32 is connected to a common rail 34 serving as an accumulating piping common to all of the cylinders, and therefore, fuel staying inside of common rail 34 is designed to be injected into combustion chamber 3 by injector 32 when injection controlling solenoid valve 32a is opened. A relatively high pressure equivalent to a fuel injecting pressure is accumulated in common rail 34. In order to achieve the pressure accumulation, common rail 34 is connected to a discharge port 36a of a supply pump 36 via a supply piping 35. Moreover, on the way of supply piping 35 is disposed a check valve 37. The presence of check valve 37 allows the fuel to be supplied from supply pump 36 to common rail 34, and further, restricts the fuel from flowing back from common rail 34 to supply pump 36.

Supply pump 36 is connected to a fuel tank 38 through an intake port 36b, on the way of which a filter 39 is disposed. Supply pump 36 takes in the fuel from fuel tank 38 through filter 39. At the same time, supply pump 36 forces a plunger to make a reciprocating motion via a cam in synchronism with the rotation of engine 2, thereby increasing a fuel pressure up to a required pressure, and supplies the high-pressure fuel to common rail 34.

Moreover, in the vicinity of discharge port 36a of supply pump 36 is disposed a pressure control valve 40. Pressure control valve 40 is adapted to control the fuel pressure (i.e., an injection pressure) to be discharged from discharge port 36a to common rail 34. Upon opening pressure control valve 40, extra fuel which is not discharged from discharge port 36a is designed to be returned to fuel tank 38 from a return port 36c disposed in supply pump 36 through a return piping 41.

In combustion chamber 3 in engine 2 is disposed a glow plug 42. Glow plug 42 is a start auxiliary device which glows when a current flows in a glow relay 42a immediately before the start of engine 2 and promotes ignition and combustion upon spraying a part of a fuel mist thereto.

Incidentally, in an output shaft (i.e., a crankshaft) of engine 2 is disposed an engine speed sensor 44, which includes a rotor rotating in synchronism with the rotation of the output shaft and is constituted of an electromagnetic pick-up for detecting a projection formed at the outer peripheral surface of the rotor so as to output a pulse signal according to the rotational speed. An output from engine speed sensor 44 is taken into ECU 20 as a signal contributable to calculation of the engine speed of engine 2.

Besides, into ECU 20 are taken together acceleration pedal position information (i.e., acceleration pedal depressing quantity information) detected by an acceleration pedal position sensor 46, ON or OFF information on an IG (abbreviating "ignition") switch 48, ON or OFF information on a starter switch 50, coolant temperature information detected by a coolant temperature sensor 52 disposed in a cylinder block 2b, shift position information detected by a shift position sensor 54 disposed in a transmission, vehicle speed information detected in response to a signal from a vehicle speed sensor 56, fuel temperature information detected by a fuel temperature sensor 58 disposed on return piping 41, fuel pressure (i.e., an injection pressure PC) information detected by a fuel pressure sensor 60 disposed in common rail 34, and the like in addition to the intake air quantity information detected by intake air quantity sensor 8 and the intake air temperature information detected by intake air temperature sensor 10, as described above.

—Explanation of EGR Valve Controller—

Figure 2:
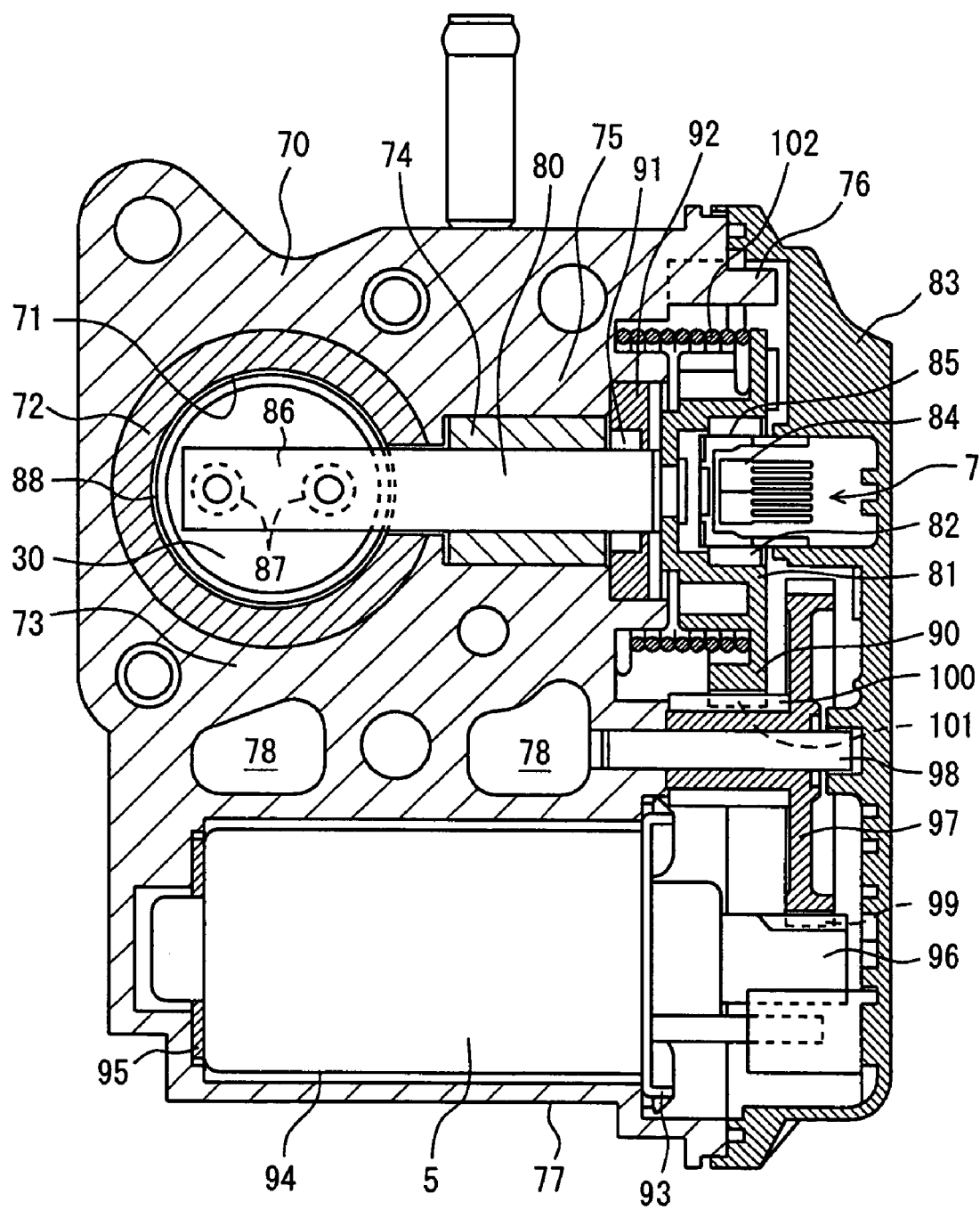
FIG. 2 is a cross-sectional view showing a principal structure of an EGR valve controller.
Figure 3:
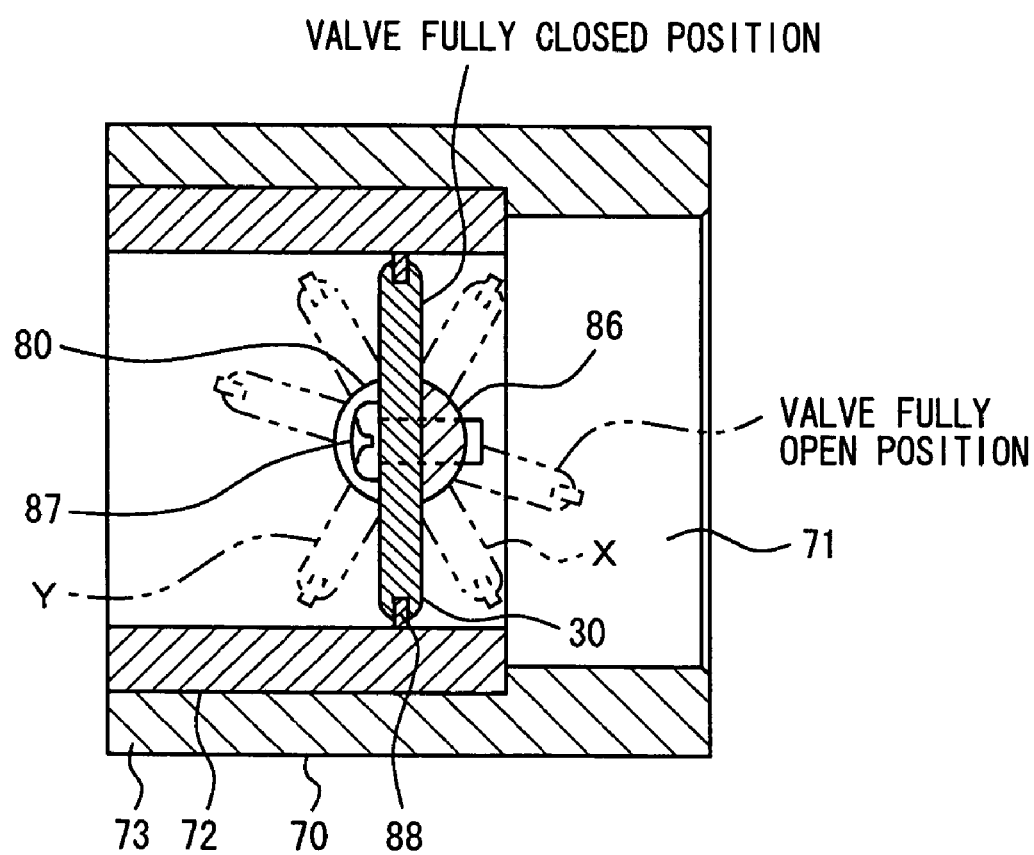
FIG. 3 is a view showing an opening position of an EGR valve.

Next, explanation will be made on an EGR valve controller including EGR valve 30 and actuator (i.e., a valve actuating unit) 28 for driving EGR valve 30. FIG. 2 is a cross-sectional view showing a principal structure of the EGR valve controller, and FIG. 3 is a view showing an opening position of EGR valve 30.

The EGR valve controller in the present preferred embodiment includes: a valve housing 70 constituting a part of EGR pipe 26; a circularly cylindrical nozzle 72 fitted to an exhaust gas free wheel channel 71 formed on valve housing 70; EGR valve 30 openably housed inside of nozzle 72; a valve shaft 80 rotated integrally with EGR valve 30; a drive motor 5 for rotatably driving valve shaft 80; and a power unit having a powertrain for transmitting the rotational power of drive motor 5 to valve shaft 80 (wherein the detailed configuration of the power unit will be described later). The power unit is designed to be driveably controlled by ECU 20.

Moreover, the EGR valve controller includes a valve opening position sensor 7 for converting the opening position of EGR valve 30 into an electric signal. Valve opening position sensor 7 transmits a sensor output of an upper limit voltage (e.g., 4 V) when EGR valve 30 is located at a valve fully open position (i.e., a maximum opening position): in contrast, it transmits a sensor output of a lower limit voltage (e.g., 1 V) when EGR valve 30 is located at a valve fully closed position (i.e., a minimum opening position). Additionally, valve opening position sensor 7 includes: a rotor 81 fixed to a right end of valve shaft 80 in FIG. 2 and made of an iron-based metallic material (i.e., a magnetic material) having a substantially U-shaped cross section; a split type permanent magnet 82 (formed into a substantially rectangular shape) serving as a magnetic field generating source; a split type yoke (i.e., a magnetic member) (formed into a substantially arcuate shape) to be magnetized to permanent magnet 82; a plurality of Hall devices 84 disposed integrally on a side of a sensor cover 83 in such a manner as to face split type permanent magnet 82; a terminal which is made of a conductive metal thin plate and electrically connects Hall device 84 to ECU 20; and a stator 85 which is made of an iron-based metallic material (i.e., a magnetic material) and concentrates a magnetic flux on Hall device 84.

Split type permanent magnet 82 and the split type yoke are bonded with an adhesive or the like to the inner circumferential surface of rotor 81 insert-molded in a deceleration gear, which is one of constituent elements of the powertrain. Here, in split type permanent magnet 82, substantially rectangular permanent magnets vertically magnetized in FIG. 2 (i.e., the up side designates an N pole while the down side designates an S pole) are arranged such that the same pole is oriented in the same direction. Hall device 84 is a non-contact type detecting device, and is oppositely disposed on the inner circumferential side of permanent magnet 82, so that when a magnetic field of the N pole or the S pole is produced at a sensing surface, an electromotive force is produced by sensing the magnetic field (i.e., a plus potential is produced when the magnetic field of the N pole is produced: in contrast, a minus potential is produced when the magnetic field of the S pole is produced).

Valve housing 70 is a device for rotatably holding EGR valve 30 in a rotational direction from a valve fully closed position to a valve fully open position (both of the positions are shown in FIG. 3) inside of exhaust gas free wheel channel 71 formed in nozzle 72, and is tightly secured to the exhaust gas free wheel channel by using a tightening tool such as a bolt. With valve housing 70 is integrally formed a nozzle fitting portion 73 for fitting and holding nozzle 72. Furthermore, a shaft bearing 75 for rotatably supporting one end of valve shaft 80 via a metal bearing (i.e., a cantilever bearing) 74 is formed integrally with nozzle 72 and nozzle fitting portion 73.

Since valve housing 70 is used in a thermally severe environment, it is formed integrally with a heat resistant material, which is highly resistant against a high temperature, such as stainless steel. Like valve housing 70, nozzle 72 also is formed into a circularly cylindrical shape with a heat resistant material, which is highly resistant against a high temperature, such as stainless steel. Metal bearing 74 is formed into a cylindrical shape with, for example, Ni—Cu—C. Outside of nozzle fitting portion 73 and shaft bearing 75 is integrally formed a recessed gear case 76 rotatably containing the powertrain in the power unit.

On an outer wall of nozzle fitting portion 73 and shaft bearing 75, as shown downward in FIG. 2, is integrally formed a recessed motor housing 77 which houses therein drive motor 5 in the power unit. Heat insulating layers 78 for preventing any heat of the EGR gas from being transmitted in the atmosphere inside of motor housing 77 by the use of air are disposed between nozzle fitting portion 73 and motor housing 77 and between shaft bearing 75 and motor housing 77, for example, in nozzle fitting portion 73 around exhaust gas free wheel channel 71, in the vicinity of the valve fully closed position, or around nozzle 72.

Additionally, to valve housing 70 are connected a coolant piping for allowing an engine coolant (hot water) within a predetermine temperature range (for example, from 75° C. to 80° C.) to flow in a hot water circulation channel formed in nozzle fitting portion 73, for example, around exhaust gas free wheel channel 71, in the vicinity of the valve fully closed position, or around nozzle 72, and another coolant piping for allowing the hot water to flow out of the hot water circulation channel. Here, the engine coolant (the hot water) may be circulated in and supplied to heat insulating layer 78.

Onto an opening side of gear case 76 and motor housing 77 in valve housing 70 is fixed sensor cover 83 for closing the opening side of gear case 76. Sensor cover 83 is made of a thermoplastic resin capable of electrically insulating the terminals of valve opening position sensor 7 from each other. Sensor cover 83 has a portion to be fitted (i.e., a joint end) to be fitted to a fitting portion (i.e., a joint end) formed on the opening side of gear case 76 and motor housing 77, thus to be air-tightly incorporated in the fitting portion formed on the opening side of gear case 76 via a rivet or a screw.

EGR valve 30 is a butterfly-like rotary valve, which is formed into a substantial disk with a heat resistant material, which is highly resistant against a high temperature, such as stainless steel, like nozzle 72, and further, controls the EGR quantity of the EGR gas to be mixed in the intake air flowing in the intake pipe. Moreover, EGR valve 30 is tightly secured to a valve disposing portion 86 formed at valve shaft 80 by the use of a plurality of screws 87 such as tightening screws or fixing bolts. At an outer peripheral portion of EGR valve 30 is formed an annular holding groove for holding a seal ring (i.e., a sealant) 88 which can be brought into slide-contact with an inner wall surface (i.e., a channel wall surface) of nozzle 72 near the valve fully closed position. Here, seal ring 88 is formed into an annular shape with a heat resistant material, which is highly resistant against a high temperature, such as stainless steel, like EGR valve 30.

Valve shaft 80 is formed integrally with a heat resistant material, which is highly resistant against a high temperature, such as stainless steel, like EGR valve 30, has semi-circular valve disposing portion 86 for holding EGR valve 30, and is rotatably or slidably supported by shaft bearing 75. At an end of valve shaft 80 are integrally formed a gear 90 on the valve side, which is one of the constituent elements of the powertrain, and a caulking portion for fixing rotor 81, which is one of the constituent elements of valve opening position sensor 7, by fixing means such as caulking. Incidentally, an annular stopper 92 for holding an oil seal 91 is interposed between the right end of valve shaft 80, as shown in FIG. 2, and the inner circumferential portion of shaft bearing 75.

The power unit in the present preferred embodiment is constituted by including drive motor 5 for driving valve shaft 80 in the rotational direction, and the powertrain (i.e., a gear deceleration mechanism in the present preferred embodiment) for transmitting the rotational power of drive motor 5 to valve shaft 80. Drive motor 5 is a drive source which is connected to a motor electrifying terminal embedded in gear case 76 and sensor cover 83, to be thus actuated by the electrification. Drive motor 5 is a drive source including a metallic front frame 93, a cylindrical yoke 94, a plurality of permanent magnets, a motor shaft, an armature core, an armature coil, and the like.

Drive motor 5 is a motor actuator (i.e., a DC electric motor) which is electrified via two motor electrifying terminals embedded and held in sensor cover 83, two motor connecting terminals integrally connected to the motor electrifying terminals and projecting from sensor cover 83 toward drive motor 5, and two motor power supplying terminals detachably connected to the motor connecting terminals, thereby rotating the motor shaft.

Moreover, in the present preferred embodiment, a drive current to drive motor 5 is controlled to be fed back in such a manner that an instructed EGR quantity (i.e., a target valve opening position) instructed by ECU 20 and a detected EGR quantity (i.e., a valve opening position) detected by valve opening position sensor 7 are substantially equal to each other. Incidentally, it is desirable that a control instruction value (i.e., a drive current) to drive motor 5 should be controlled by a duty control. In other words, the present preferred embodiment adopts the duty control for changing the valve opening position by adjusting an ON/OFF rate (i.e., an electrification rate or a duty ratio) of a control pulse signal per unit time according to a deviation between the instructed EGR quantity (i.e., the instructed valve opening position) and the detected EGR quantity (i.e., the valve opening position).

Front frame 93 is tightly fixed to the end of motor housing 77 on the opening side by using the screw such as the fixing bolt or the tightening screw. The end of yoke 94 on the front side is caulked at a plurality of points at front frame 93 by the fixing means such as the caulking. Here, a wave washer 95 for generating an urging force, which urges drive motor 5 rightward in FIG. 2 (i.e., an urging force for urging drive motor 5 against front frame 93), is interposed between a projecting end yoke of yoke 94 of drive motor 5 and a recessed bottom wall of motor housing 77 in the present preferred embodiment. Wave washer 95 is elastically deformed in substantially the same direction as the axial direction of the motor shaft, and further, is an annular elastic member which is molded in a waveform in a circumferential direction.

The gear deceleration mechanism is valve drive means, which is adapted to decelerate the rotational speed of the motor shaft of drive motor 5 in such a manner as to become a predetermined deceleration ratio, and includes a pinion gear 96 secured around the motor shaft of drive motor 5, an intermediate deceleration gear 97 rotated in mesh with pinion gear 96, and valve side gear 90 rotated in mesh with intermediate deceleration gear 97, thereby rotatably driving valve shaft 80. Pinion gear 96 is a motor side gear which is integrally formed into a predetermined shape with a metallic material and is integrally rotated with the motor shaft of drive motor 5.

Intermediate deceleration gear 97 is integrally formed into a predetermined shape with a resin material, and is rotatably fitted around a support shaft 98 serving as a rotational center. Intermediate deceleration gear 97 includes a large-diameter gear 99 in mesh with pinion gear 96 and a small-diameter gear 100 in mesh with valve side gear 90. Here, pinion gear 96 and intermediate deceleration gear 97 are torque transmitting means for transmitting a torque from drive motor 5 to valve side gear 90. One end of support shaft 98 in an axial direction (a right end in FIG. 2) is fitted into a recessed portion formed at the inner wall surface of sensor cover 83 and in contrast, the other end (a left end in FIG. 2) is securely press-fitted to a recessed portion formed at a bottom wall surface of gear case 76.

Valve side gear 90 in the present preferred embodiment is integrally formed into a predetermined annular shape with a resin material. Around valve side gear 90 is integrally formed a gear 101 in mesh with small-diameter gear 100 of intermediate deceleration gear 97. Here, in the exhaust gas recirculation apparatus in the present preferred embodiment, a return spring 102 is interposed between the bottom wall surface of gear case 76 and the left end of valve side gear 90 in FIG. 2. Incidentally, rotor 81 made of the iron-based metallic material (i.e., the magnetic material) is insert-molded on an inner diameter side of valve side gear 90.

Subsequently, a description will be given of the operation of the exhaust gas recirculation apparatus in the present preferred embodiment. When intake valve 4a in engine 2 is opened upon the start of engine 2, the intake air filtered through air cleaner 6 is distributed to intake manifolds of cylinders #1 to #4 through intake path 4, to be thus sucked into cylinders #1 to #4 in engine 2. The air is compressed in engine 2 until the temperature exceeds a fuel combustion temperature, and the fuel is atomized from injector 32, followed by the combustion. Combustion gas burnt in cylinders #1 to #4 is discharged from the exhaust port through an exhaust manifold and exhaust path 24. At this time, drive motor 5 is electrified such that EGR valve 30 is opened at a predetermined opening position by ECU 20, thereby rotating the motor shaft of drive motor 5.

The rotation of the motor shaft rotates pinion gear 96, so that the torque is transmitted to large-diameter gear 99 in intermediate deceleration gear 97. Small-diameter gear 100 is rotated on support shaft 98 in association with the rotation of large-diameter gear 99, thereby rotating valve side gear 90 having gear 101 in mesh with small-diameter gear 100. As a consequence, since valve side gear 90 is rotated on valve shaft 80, valve shaft 80 is rotated by a predetermined rotational angle, so that EGR valve 30 is rotatably driven in a direction toward the fully opening position (i.e., in the opening direction) from a valve fully closed position. Then, a part of the exhaust gas in engine 2 as the EGR gas flows in valve housing 70 and exhaust gas free wheel channel 71 of nozzle 72 through EGR pipe 26. The EGR gas flowing in exhaust gas free wheel channel 71 flows in intake path 4, to be mixed with the intake air flowing from air cleaner 6.

Incidentally, an EGR gas free wheel quantity is controlled to be fed back in such a manner as to hold a predetermined value based on detection signals output from intake air quantity sensor (i.e., an air flow meter) 8, intake air temperature sensor 10 and valve opening position sensor 7. Consequently, the intake air sucked into cylinders #1 to #4 in engine 2 is designed to be mixed with the EGR gas returned into intake path 4 through exhaust gas free wheel channel 71 from exhaust path 24 by linearly controlling the valve opening position of EGR valve 30 so as to achieve the EGR quantity set according to the operating state of engine 2 in order to reduce emission.

—EGR Valve Control Operation—

Figure 4:
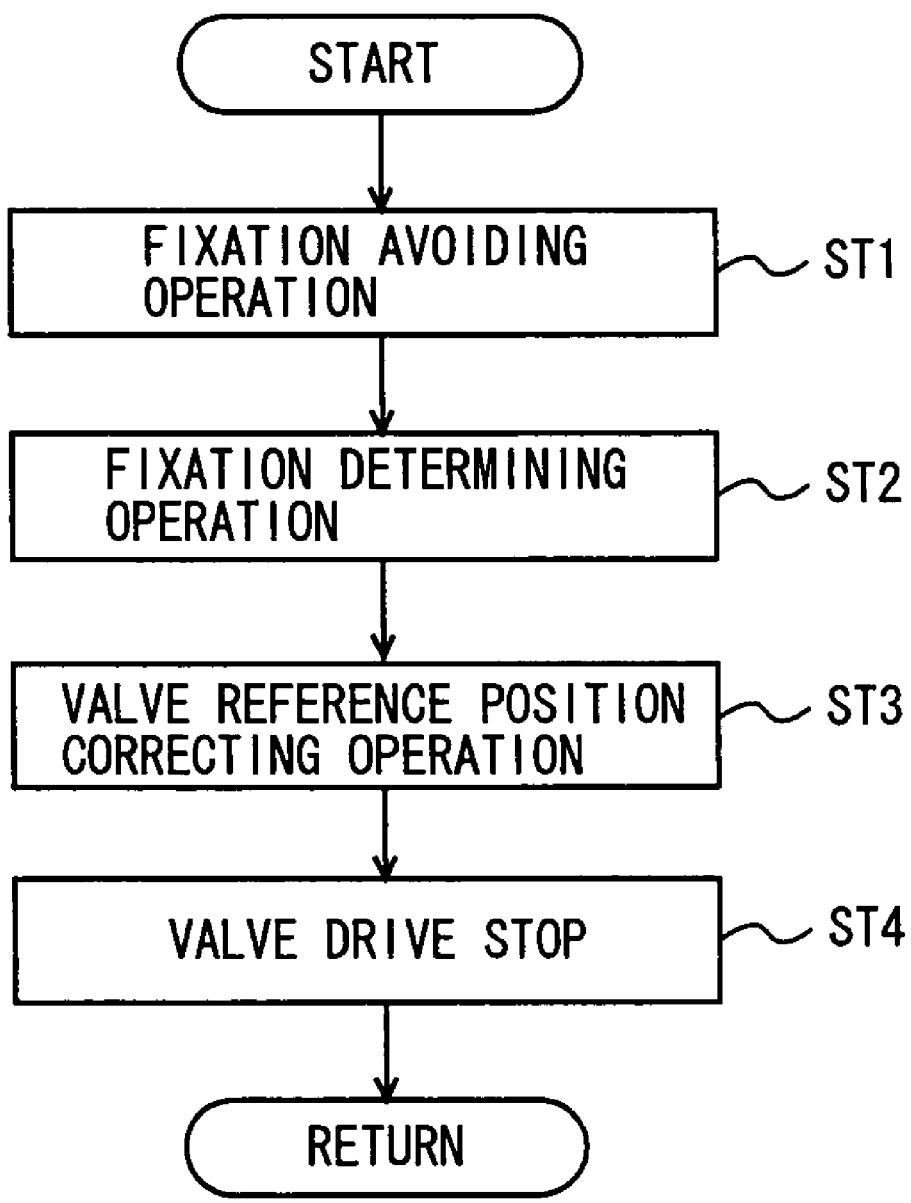
FIG. 4 is a flowchart illustrating control procedures of the entire EGR valve control operation.

Next, explanation will be made on control operations featuring the present preferred embodiment. In reference to FIG. 4, the entire control procedures will be schematically described before the explanation of various kinds of control operations.

First of all, "a fixation avoiding operation" for removing the deposits is performed after engine 2 stops in consideration of a fear of fixation of EGR valve 30 to the inner circumferential surface or the like of exhaust gas free wheel channel 71 due to the deposits as the sediments of the combustion product contained in the EGR gas (step ST1). In the case where EGR valve 30 is opened/closed for the purpose of "the fixation avoiding operation" during the operation of engine 2, the EGR gas quantity may be accidentally shifted from a proper value, thereby possibly inducing an inconvenience such as degradation of emission. However, "the fixation avoiding operation" is performed after engine 2 stops in the present preferred embodiment, thus avoiding such an inconvenience.

Following "the fixation avoiding operation", "a fixation determining operation (a determining operation performed by a fixation determiner according to the present invention)" is performed so as to determine as to whether or not the fixation of EGR valve 30 is eliminated (step ST2). After these operations, only in the case where it is determined that the fixation of EGR valve 30 is eliminated as a result of "the fixation determining operation", EGR valve 30 is fixed at a predetermined reference position, which is regarded as a valve reference position when EGR valve 30 is opened/closed during the operation of the engine, thus performing a correcting (i.e., learning) operation (step ST3). Thereafter, the opening control of EGR valve 30 is stopped, and the engine comes to a normal stop state (step ST4). Hereinafter, a description will be given of each of the control operations.

—Fixation Avoiding Operation—

The EGR valve controller in the present preferred embodiment is designed to perform "the fixation avoiding operation" for removing the deposits in consideration of a fear of fixation of EGR valve 30 to the inner circumferential surface or the like of exhaust gas return channel 71 due to the deposits as the sediments of the combustion product contained in the EGR gas. In accordance with "the fixation avoiding operation", drive motor 5 is driven after engine 2 stops (immediately after the stop), so that EGR valve 30 is opened/closed within the predetermined angular range near the fully closed position. The angle ranges from 30° (i.e., a position indicated by reference character X in FIG. 3) on a plus side from the fully closed position of EGR valve 30 (i.e., toward the fully opening position of EGR valve 30) to 30° (i.e., a position indicated by reference character Y in FIG. 3) on a minus side from the fully closed position (i.e., in a direction opposite to a direction toward the fully opening position of EGR valve 30). The fixed deposits are scraped by EGR valve 30 by alternately performing the opening operation of EGR valve 30 toward the plus side and the opening operation of EGR valve 30 toward the minus side, thereby eliminating the fixation of EGR valve 30. Here, the angular range is not limited to the above-described example, but it may be arbitrarily set. Otherwise, the angles on the plus and minus sides may be different from each other. Or, the valve at the time of the start of the fixation avoiding operation may be opened for the first time around toward either of the plus and minus sides.

Figure 5:
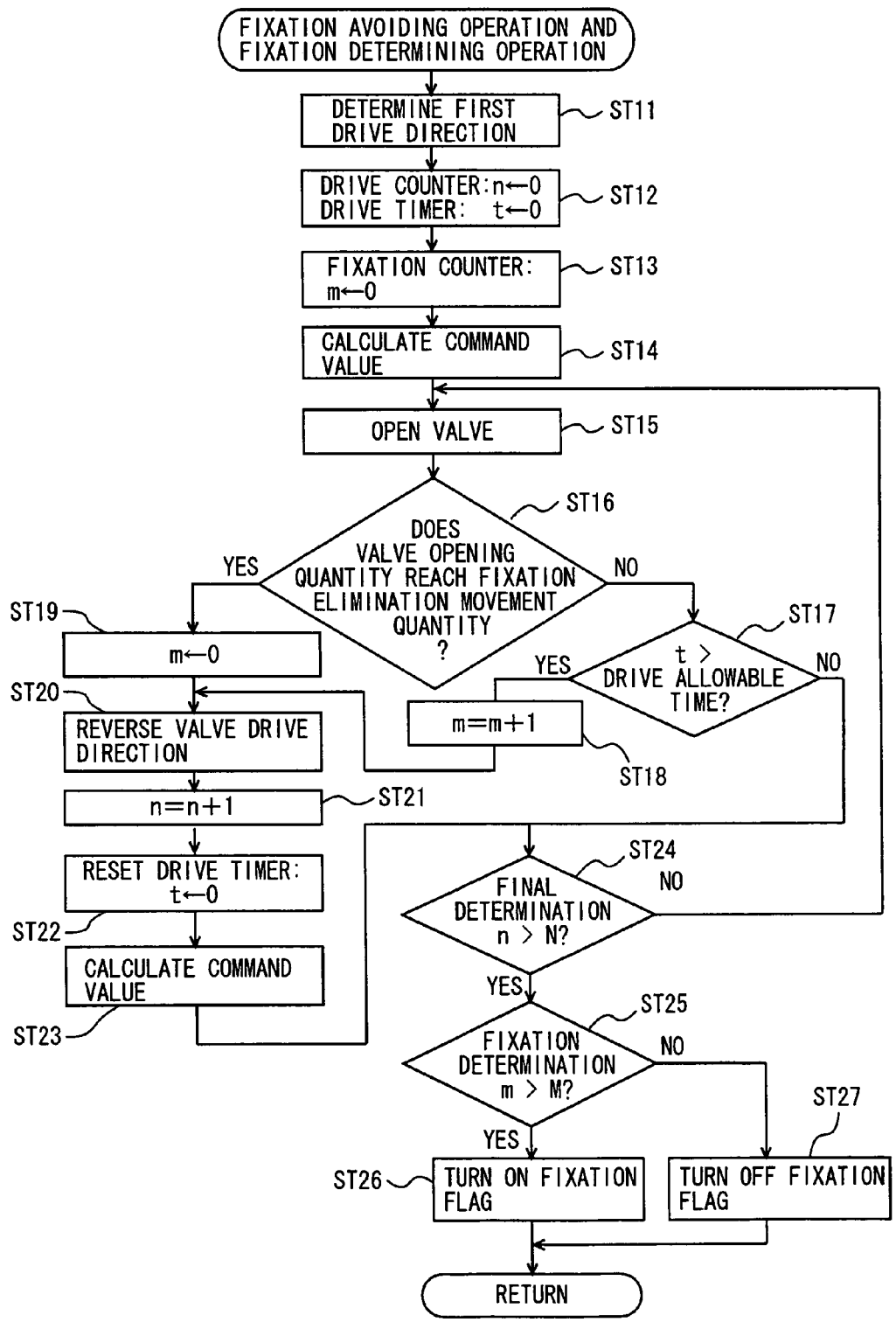
FIG. 5 is a flowchart illustrating control procedures of a fixation avoiding operation and a fixation determining operation.

After "the fixation avoiding operation" is performed, ECU 20 performs "the fixation determining operation" to determine as to whether or not the fixation of EGR valve 30 is eliminated by "the fixation avoiding operation". According to "the fixation determining operation", it is determined that the fixation of EGR valve 30 is eliminated in the case where a valve movement quantity reaches a predetermined fixation elimination movement quantity (at a position at 30° from the above-described fully closed position) within a predetermined movement control time when EGR valve 30 is moved in one direction (for example, toward the plus side), as illustrated in reference to a flowchart (i.e., a flowchart of FIG. 5). "The fixation avoiding operation" and "the fixation determining operation" following "the fixation avoiding operation" will be explained below in reference to the flowchart of FIG. 5.

When engine 2 stops by turning an ignition switch off or the like, "the fixation avoiding operation" is started. First in step ST11 of "the fixation avoiding operation", a first drive direction is determined. For example, the plus side is determined as the drive direction of EGR valve 30. In step ST12, a count value n of a drive counter previously set inside of ECU 20 is reset to "0", and further, a timer value t of a drive timer also is reset to "0". Moreover, in step ST13, a count value m of a fixation counter is reset to "0".

In step ST14, a command value for determining the opening position of EGR valve 30 is calculated. In this case, EGR valve 30 is opened at 30° toward the plus side from the fully closed position, and therefore, the command value for opening EGR valve 30 at this position is calculated. After the calculation of the command value, the opening operation of EGR valve 30 is started in accordance with the command value (step ST15). In other words, a current according to the command value is supplied to drive motor 5, thereby starting the opening operation of EGR valve 30.

After the start of the opening control with respect to EGR valve 30 in this manner, "the fixation determining operation" is performed accordingly. First, it is determined in step ST16 as to whether or not the opening position of EGR valve 30 reaches within a predetermined drive range (hereinafter, this movement quantity will be referred to as "a fixation elimination movement quantity"). That is to say, it is determined as to whether or not EGR valve 30 located at a position at 0° reaches a position at 30° on the plus side. Since EGR valve 30 has not reached yet the position at 30° on the plus side immediately after the start of "the fixation avoiding operation", the result in step ST16 is negative, and thereafter, the control routine proceeds to step ST17. In step ST17, it is determined as to whether or not timer value t of the drive timer exceeds a predetermined drive allowable time (i.e., the above-described movement control time). This drive allowable time is set to, for example, a value of 1 sec. Since timer value t of the drive timer has not exceeded yet the predetermined drive allowable time immediately after the start of "the fixation avoiding operation", the result in step ST17 is negative, and thereafter, the control routine proceeds to step ST24. It is determined in step ST24 as to whether or not count value n of the drive counter reaches a predetermined value N (as to whether or not the fixation avoiding operation is completed). This count value n is incremented (i.e., added with "1") every time EGR valve 30 is opened on the plus or minus side (see step ST21). In the meantime, predetermined value N is set to, for example, "10". In other words, it is determined in step ST24 as to whether or not the operation for opening EGR valve 30 on the plus or minus side is performed ten times in total. Since count value n of the drive counter has not exceeded yet predetermined value N immediately after the start of "the fixation avoiding operation", the result in step ST24 is negative, and thereafter, the control routine returns to step ST15, in which EGR valve 30 is continuously opened in accordance with the above-described command value.

During the continuation of the above-described operation, in the case where timer value t of the drive timer exceeds the drive allowable time (the result in step ST17 is affirmative) before the opening position of EGR valve 30 reaches the predetermined drive range (without any affirmative determination in step ST16), the control routine proceeds to step ST18, in which count value m of the fixation counter is incremented (i.e., added with "1").

In contrast, in the case where the opening quantity of EGR valve 30 reaches the fixation elimination movement quantity (the result in step ST16 is affirmative) before timer value t of the drive timer reaches the drive allowable time (without any affirmative determination in step ST17), the control routine proceeds to step ST19, in which count value m of the fixation counter is reset to "0".

After count value m of the fixation counter is incremented or reset, the control routine proceeds to step ST20, in which EGR valve 30 is driven in a reverse direction. Specifically, if the first drive direction is set on the plus side in step ST11, the drive direction of EGR valve 30 is reversed on the minus side in step ST20. Thereafter, the control routine proceeds to step ST21, count value n of the drive counter is incremented (i.e., added with "1"), and the control routine proceeds to step ST22. In step ST22, the drive timer is reset, and thereafter, the command value is calculated again in step ST23. In this manner, the control routine proceeds to step ST24.

The above-described operation is continuously repeated until the result in step ST24 is affirmative, that is, until the operation for opening EGR valve 30 on the plus or minus side is performed ten times in total. In other words, count value m of the fixation counter is incremented as long as the state is kept in the case where timer value t of the drive timer reaches the drive allowable time before the opening quantity of EGR valve 30 reaches the fixation elimination movement quantity during the above-described opening operation ten times in total (i.e., in the case where there is a possibility of generation of the fixation of EGR valve 30). In contrast, count value m of the fixation counter is reset to "0" in the case where the opening quantity of EGR valve 30 reaches the fixation elimination movement quantity before timer value t of the drive timer reaches the drive allowable time (i.e., in the case where the fixation of EGR valve 30 is eliminated).

If the result is affirmative in step ST24, the control routine proceeds to step ST25, in which it is determined as to whether or not count value m of the fixation counter exceeds a predetermined fixation determination time M (it is determined as to whether or not there is fixation). Specifically, it is determined as to whether or not fixation is possibly generated in EGR valve 30 times more than fixation determination time M without resetting count value m of the fixation counter to "0" in step ST19. If the result is affirmative, it is determined that the fixation is generated in EGR valve 30 (i.e., the fixation is not eliminated) with high possibility irrespective of "the fixation avoiding operation", thereby turning on a fixation flag in step ST26. In contrast, if the result in step ST 25 is negative, it is determined that the fixation of the EGR valve is eliminated by "the fixation avoiding operation", thereby turning off the fixation flag in step ST27.

In accordance with the above-described operation, the fixation flag is turned on or off, thus completing "the fixation avoiding operation" and "the fixation determining operation" following "the fixation avoiding operation".

Figure 6:
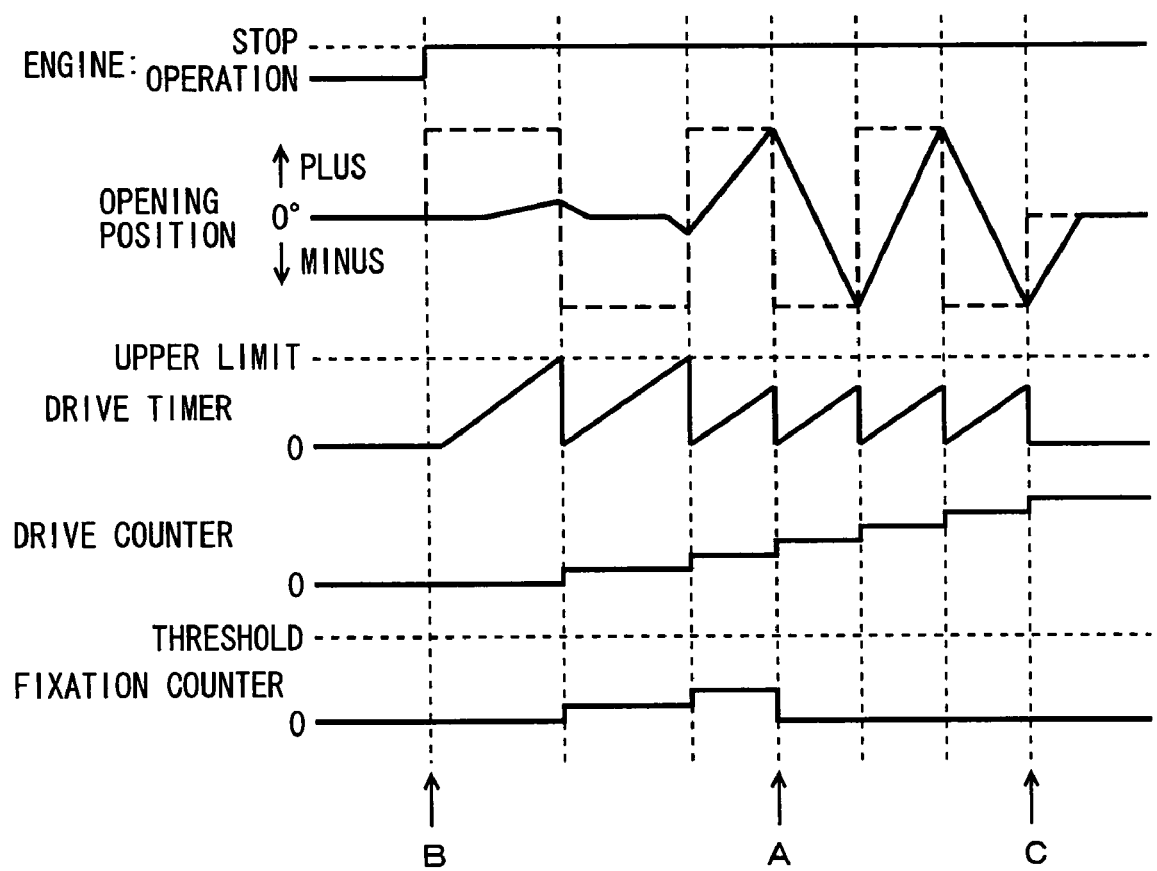
FIG. 6 is a timing chart illustrating changes in timer value of a drive timer, count value of a drive counter and count value of a fixation counter in a situation in which a fixation flag is set to OFF.
Figure 7:
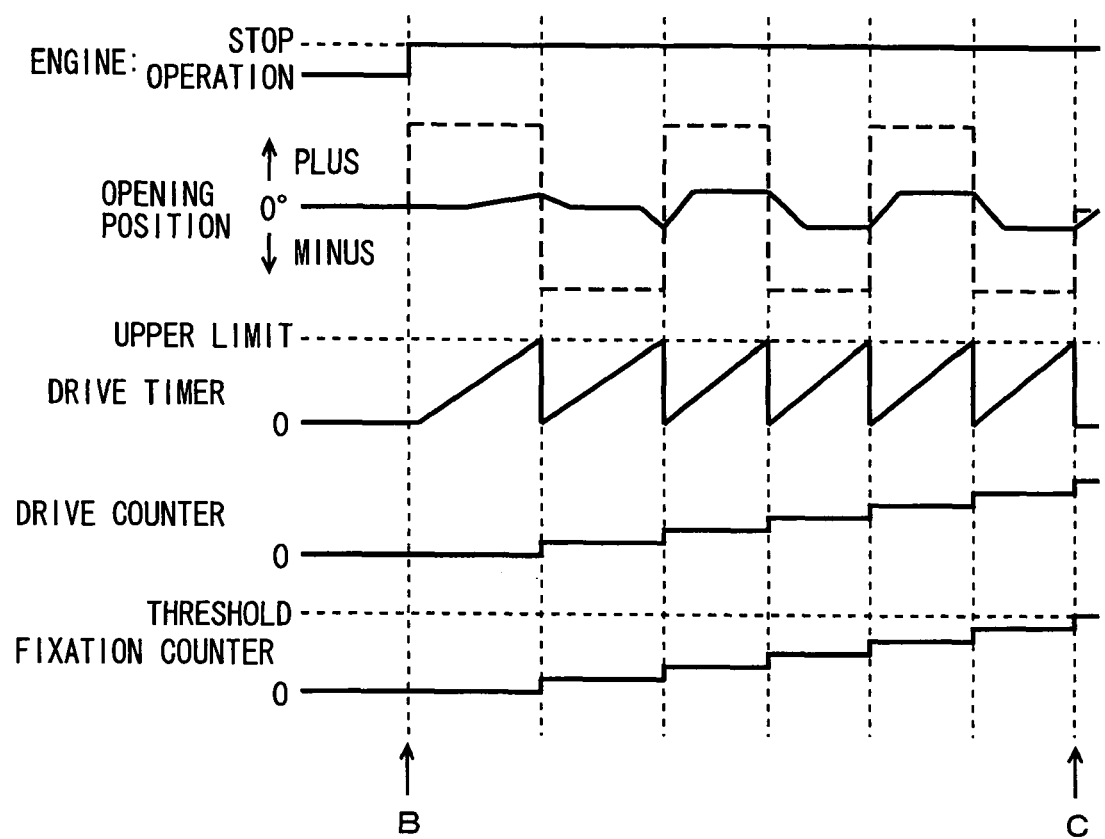

FIG. 6 is a timing chart illustrating changes in timer value of the drive timer, count value of the drive counter and count value of the fixation counter in the situation in which the fixation flag is set to OFF; and FIG. 7 is a timing chart illustrating the changes in timer value of the drive timer, count value of the drive counter and count value of the fixation counter in the situation in which the fixation flag is set to ON.

In the situation in which the fixation flag is set to OFF, that is, in the situation in which the fixation of EGR valve 30 is eliminated by performing "the fixation avoiding operation", EGR valve 30 can be largely opened, for example, during "the fixation avoiding operation" (at a timing A in FIG. 6), the count value of the fixation counter is reset to "0" at this timing. In FIG. 6, a timing B represents the start of "the fixation avoiding operation"; a timing C represents the completion of "the fixation avoiding operation"; and a broken line indicates a valve opening position command signal during "the fixation avoiding operation", wherein the movement direction of EGR valve 30 is switched at a timing at which the sign of the command signal is reverse. In FIG. 6, "an upper limit" of the drive timer signifies the above-described drive allowable time; and "a threshold" in the fixation counter signifies fixation determination time M (the same goes for those in FIG. 7). Since the drive direction of EGR valve 30 is reversed before timer value t of the drive timer reaches the predetermined drive allowable time, the opening operations of EGR valve 30 toward the plus and minus sides can be completed in a short period of time (i.e., the operations ten times in total are completed), thereby shortening a time required for "the fixation avoiding operation" and "the fixation determining operation".

In contrast, in the situation in which the fixation flag is set to ON, that is, in the situation in which the fixation of EGR valve 30 is generated with a high possibility irrespective of "the fixation avoiding operation", EGR valve 30 cannot be largely opened. The count value of the fixation counter is continuously incremented, and thus, "the fixation avoiding operation" and "the fixation determining operation" are completed in the situation in which count value m of the fixation counter exceeds fixation determination time M.

—Valve Reference Position Correcting Operation—

Subsequently, explanation will be made on a "valve reference position correcting operation" which is performed when it is determined that the fixation of EGR valve 30 is eliminated by "the determining operation". The "valve reference position correcting operation" is not performed when it is determined that the fixation of EGR valve 30 is not eliminated by "the fixation determining operation". In such a case, the opening position of EGR valve 30 is not controlled (i.e., the valve opening/closing operation is prohibited) even if engine 2 is started to be actuated thereafter. As a consequence, correction of a valve reference position can be prohibited in the state of the fixation of EGR valve 30, thereby avoiding any erroneous recognition of the valve reference position and preventing any breakage of EGR valve 30 caused by the forcible actuation of fixed EGR valve 30.

"The valve reference position correcting operation" includes two operations, as follows: namely, according to "the valve reference position correcting operation", EGR valve 30 is located at a predetermined position (i.e., a predetermined reference position), which is recognized by valve opening position sensor 7 and is corrected in such a manner as to be regarded as a reference position in performing the valve opening/closing control operation. During the actuation of the engine thereafter, the valve opening/closing control operation is performed based on the recognized reference position. The predetermined positions, at which EGR valve 30 is located, at this time include positions, as follows:

First of all, the fully closed position of EGR valve 30 (i.e., an opening position at 0°) is regarded as the reference position. Two kinds of return springs 102 are provided for applying the urging force toward the plus and minus sides. In the case where the electrification to drive motor 5 is released, a position, at which the urging forces of return springs 102 balance with each other, is set to be regarded as the fully closed position of EGR valve 30.

In another positioning, there is a stopper for restricting the movement quantity of EGR valve 30 toward the minus side. The electrification to drive motor 5 allows EGR valve 30 to abut against the stopper. Such an abutment position is regarded as the reference position. For example, the stopper is disposed in EGR valve 30 at a position at 30° on the minus side. A position read by valve opening position sensor 7 is regarded as the reference position at 30° on the minus side in the state in which EGR valve 30 abuts against the stopper.

Hereinafter, a specific explanation will be made on each of the valve reference position correcting operations.

Figure 8:
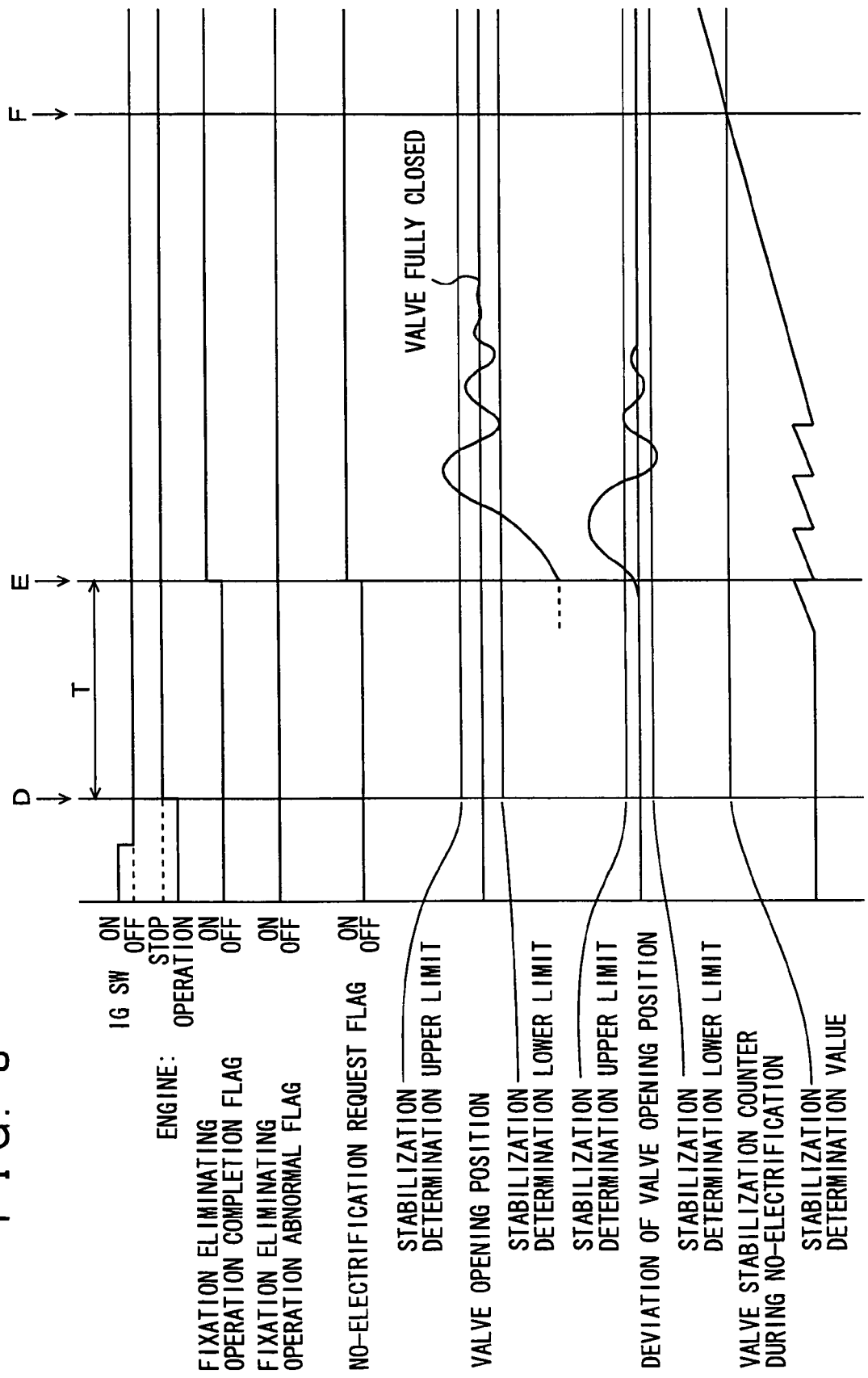
FIG. 8 is a timing chart illustrating a valve reference position correction operation in the case where a fully closed position of the EGR valve is regarded as a reference position.

First, a description will be given of the case where the fully closed position of EGR valve 30 is regarded as the reference position. FIG. 8 is a timing chart in such a case. First, when the engine comes to a halt by turning off an ignition switch (abbreviated as "an IGSW") (at a timing D in FIG. 8), "the fixation avoiding operation" and "the fixation determining operation" are started. "The fixation avoiding operation" and "the fixation determining operation" have been explained already in reference to the flowchart of FIG. 5. A time period of the operations is designated by a time T in FIG. 8. When it is determined that a fixation eliminating operation completion flag is turned on upon completion of the operations, and that the fixation of EGR valve 30 is eliminated by "the fixation determining operation", "the valve reference position correcting operation" is started (at a timing E in FIG. 8).

In "the valve reference position correcting operation", the fixation eliminating operation completion flag is first turned on, and at the same time, a no-electrification request flag is turned on, thereby releasing the electrification to drive motor 81. With this release of the electrification, EGR valve 30 is moved at the position at which the urging forces of the return springs balance with each other, that is, at the fully closed position. At this time, since spring vibrations are generated by the urging force of the return spring, the valve opening position and a deviation of the valve opening position are gradually attenuated, to be thus converged at the fully closed position. Moreover, there has been previously provided a no-electrification valve stabilization counter. The no-electrification valve stabilization counter counts up when both of the valve opening position and the deviation of the valve opening position fall within a predetermined range (i.e., between a stabilization determining upper limit and a stabilization determining lower limit in FIG. 8). The valve opening position and the deviation of the valve opening position are gradually attenuated and converged at the fully closed position, to fall within the predetermined range. After that, when the count value reaches a predetermined stabilization determining value, it is determined that EGR valve 30 reaches the fully closed position.

In this manner, when the count value of the no-electrification valve stabilization counter reaches "a stabilization determining value" (at a timing F in FIG. 8), valve opening position sensor 7 recognizes the position (i.e., the fully closed position), thereby performing the reference position correction in such a manner that the position is regarded as the reference position in performing the valve opening/closing control operation, as described above.

Figure 9:
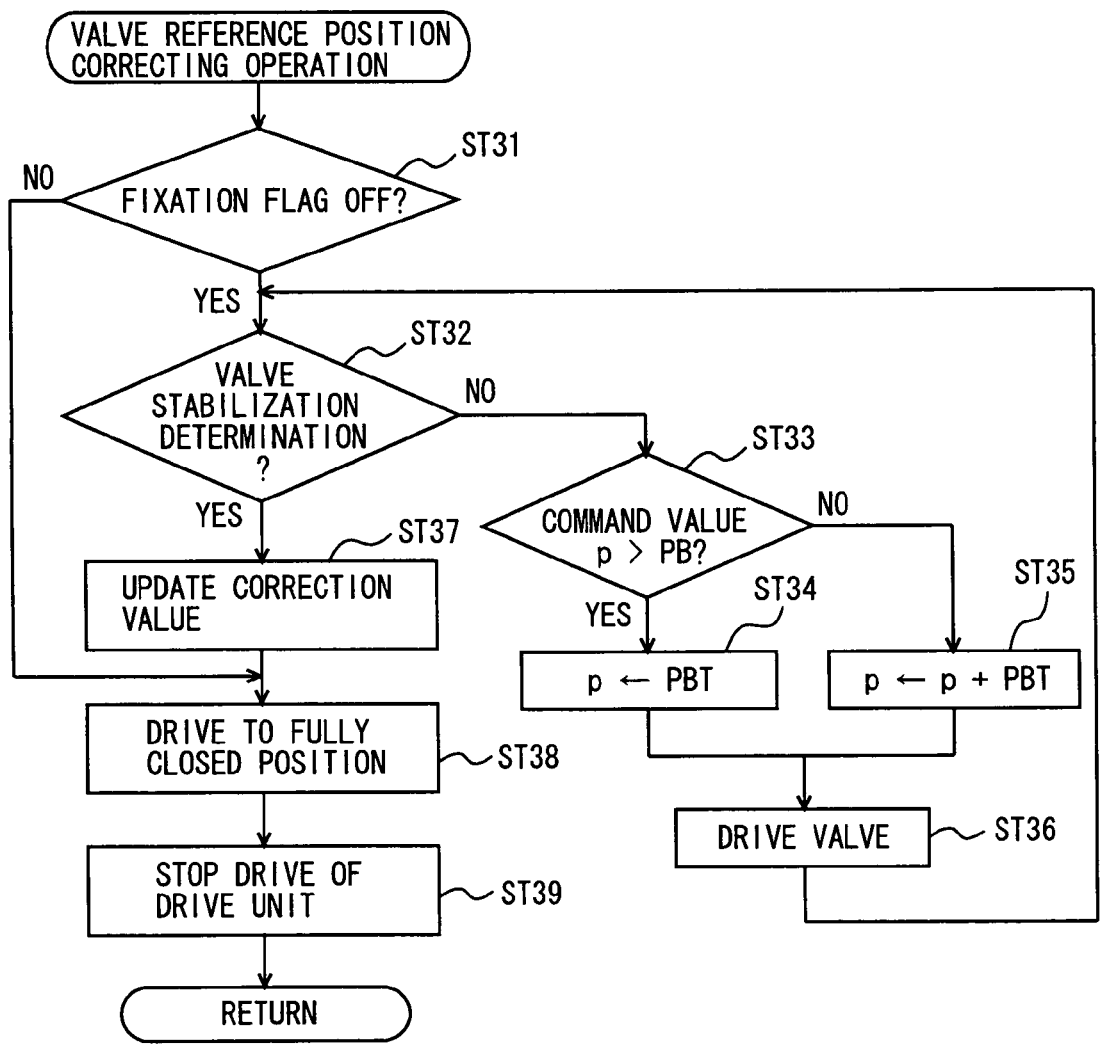
FIG. 9 is a flowchart illustrating the valve reference position correction operation in the case where a position of the EGR valve abutting against a stopper is regarded as a reference position.

Next, explanation will be made on the case where a position, at which EGR valve 30 abuts against the stopper, is regarded as the reference position. FIG. 9 is a flowchart in that case. First, it is determined in step ST31 as to whether or not the fixation flag is set to OFF in "the fixation determining operation". When the fixation of EGR valve 30 is eliminated and the fixation flag is set to OFF in "the fixation avoiding operation", the result in step ST31 is affirmative, and the control routine proceeds to step ST32. In step ST32, "a valve stabilization determination" is made to determine as to whether or not EGR valve 30 is positionally stabilized. "The valve stabilization determination" is an operation for determining as to whether or not EGR valve 30 is positionally stabilized (i.e., no play is generated in the valve) based on the abutment of EGR valve 30 against the stopper. Specifically, the determination is made based on the valve opening position, the valve opening speed, a drive DUTY and the like.

Since EGR valve 30 has not abutted yet against the stopper at the start of "the valve reference position correcting operation", a determination result in step ST32 is negative, and the control routine proceeds to step ST33. EGR valve 30 is made to abut against the stopper in a short time, and further, EGR valve 30 is avoided from being brought into contact with the stopper with a large impact in accordance with procedures in steps ST33 to ST36. In other words, the valve opening speed is increased immediately before EGR valve 30 abuts against the stopper, and thereafter, is gradually decreased (i.e., is gradually varied), thereby preventing any breakage of the gear or the stopper, and further, preventing EGR valve 30 from bouncing off the stopper. In view of this, it is determined as to whether or not a command value (p) is greater than a command value gradual variation starting opening position (PB) (in step ST33). If a result is negative, EGR valve 30 is driven at a relatively high speed by using, as command value (p), a value obtained by adding a gradually variation speed (PBD) into command value (p) (in steps ST35 and ST36). In contrast, if the result is affirmative in step ST33, a pre-gradual variation command value (PBT) is set as command value (p), and EGR valve 30 is driven at a low speed. When EGR valve 30 abuts against the stopper in accordance with these procedures, and further, is positionally stabilized, the result is affirmative in step ST32, in which valve opening position sensor 7 recognizes the position of EGR valve 30 in abutment against the stopper. The reference position is corrected in such a manner that the position of EGR valve 30 is regarded as the reference position in performing the valve opening/closing control operation (step ST37).

After the valve reference position correcting operation is performed in this manner, the control routine proceeds to step ST38, in which the electrification to drive motor 5 is released, and EGR valve 30 is returned to the fully closed position (step ST38), thereby stopping the drive by the drive unit for opening EGR valve 30.

—Modification of Fixation Determining Operation—

In "the fixation determining operation" in the above-described preferred embodiment, the elimination of the fixation is determined by count value m of the fixation counter in excess of fixation determining time M at the time of the completion of the determining operation. Besides, the determining operation may be performed, as described below.

Namely, when the operation for moving EGR valve 30 in one or the other direction is performed predetermined times (10 times in total in the above-described preferred embodiment), it is determined as to whether timer value t of the drive timer in excess of the drive allowable time (i.e., the times of the affirmative result in step ST17) is predetermined times or more (e.g., 5 times) before the opening position of EGR valve 30 reaches a predetermined drive range (without any affirmative result in step ST16). If the determination is affirmative, the fixation flag is controlled to be turned on: in contrast, if the determination is negative, the fixation flag is controlled to be turned off.

Alternatively, there may be provided no fixation counter; when the operation for moving EGR valve 30 in one or the other direction is performed predetermined times (e.g., 10 times in total), the fixation determining operation may be performed in a final movement operation; and the fixation flag may be turned off when the opening quantity of EGR valve 30 may reach the fixation elimination movement quantity (if the result in step ST16 is affirmative) before timer value t of the drive timer may reach the drive allowable time at the last time (without any affirmative result in step ST17).

Other Embodiments

The description has been given of the present invention which is applied to the control device for EGR valve 30 in common rail type in-cylinder direct-injection multi-cylinder diesel engine 2 mounted on the automobile in the above-described preferred embodiment and modification. However, the present invention is not limited to those, and therefore, the present invention can be applied to diesel engines or gasoline engines of other types. In addition, the present invention can be applied to engines for not only the automobile but also other usages. Moreover, the number of cylinders or the type of engine (of an in-line or V type) is not limited in particular.

The valve control device, to which the present invention is directed, is not limited to the control device for EGR valve 30, but may be used for throttle valve 14. That is to say, throttle valve 14 may be avoided from being fixed due to the deposits, and further, the valve reference position correcting operation may be performed in the state in which no fixation occurs.

It is construed that the preferred embodiment described herein should not be restrictive but should be illustrative in all points. Scopes of the present invention are expressed by not the above description but claims, and further, it is intended to encompass all of alterations and variations within the meaning and scope equivalent to claims.

The invention claimed is:

1. A valve control device for an internal combustion engine comprising:
   a valve disposed on a gas pipe in the internal combustion engine and allowing variation in flow rate of gas flowing in the pipe by opening/closing operations; and
   a valve actuating unit for performing a fixation avoiding operation for eliminating or preventing any fixation of the valve by opening/closing motions of the valve by a movement quantity for eliminating the fixation in one or the other direction near a valve fully closed position; wherein
   said valve actuating unit starts an operation for moving the valve in said one direction during said fixation avoiding operation, starts an operation for moving the valve in said other direction when a valve movement quantity does not reach said movement quantity for eliminating the fixation even after a lapse of a predetermined movement control time and starts the operation for moving the valve in said one direction when the valve movement quantity does not reach said movement quantity for eliminating the fixation even after the lapse of the predetermined movement control time during the operation for moving the valve in the other direction, and finishes the fixation avoiding operation after the operations for moving the valve in one direction and in the other direction are performed predetermined times.

2. The valve control device for an internal combustion engine according to claim 1, further comprising:
   a fixation determiner for determining as to whether or not said fixation avoiding operation can eliminate the fixation of the valve, wherein
   said fixation determiner determines that the fixation of the valve is eliminated in the case where the valve movement quantity reaches the movement quantity for eliminating the fixation within a predetermined movement control time after the start of the operation for moving the valve in one direction or the operation for moving the valve in the other direction.

3. The valve control device for an internal combustion engine according to claim 2, wherein said valve control device for the internal combustion engine prohibits opening/closing operations of the valve during the operation of the internal combustion engine in the case where the fixation determiner determines that the fixation of the valve is not eliminated.

4. The valve control device for an internal combustion engine according to claim 2, wherein the valve opened/closed position is set at a predetermined position in the case where the fixation determiner determines that the fixation of the valve is eliminated, and a reference position correcting operation is performed for recognizing the predetermined position as a reference position, at which the valve opening/closing control operation is performed during the operation of the internal combustion engine.

5. The valve control device for an internal combustion engine according to claim 1, further comprising:
a fixation determiner for determining as to whether or not said fixation avoiding operation can eliminate the fixation of the valve, wherein
said fixation determiner determines that the fixation of the valve is not eliminated in the case where the valve movement quantity does not reach the movement quantity for eliminating the fixation more than predetermined times even after a lapse of a predetermined movement control time after the start of the operation for moving the valve in one direction and the operation for moving the valve in the other direction are performed the predetermined times.

6. The valve control device for an internal combustion engine according to claim 5, wherein said valve control device for the internal combustion engine prohibits opening/closing operations of the valve during the operation of the internal combustion engine in the case where the fixation determiner determines that the fixation of the valve is not eliminated.

7. The valve control device for an internal combustion engine according to claim 5, wherein the valve opened/closed position is set at a predetermined position in the case where the fixation determiner determines that the fixation of the valve is eliminated, and a reference position correcting operation is performed for recognizing the predetermined position as a reference position, at which the valve opening/closing control operation is performed during the operation of the internal combustion engine.

8. The valve control device for an internal combustion engine according to claim 1, wherein said fixation avoiding operation is performed while the internal combustion engine stops.

9. A valve control method for an internal combustion engine provided with a valve disposed on a gas pipe in the internal combustion engine and allowing variation in flow rate of gas flowing in the pipe by opening/closing operations, and a valve actuating unit for performing a fixation avoiding operation for eliminating or preventing any fixation of the valve by opening/closing motions of the valve by a movement quantity for eliminating the fixation in one or the other direction near a valve fully closed position, said valve control method for an internal combustion engine comprising the steps of:
starting an operation for moving the valve in said one direction during said fixation avoiding operation;
starting an operation for moving the valve in said other direction when a valve movement quantity does not reach said movement quantity for eliminating the fixation even after a lapse of a predetermined movement control time, and starting the operation for moving the valve in said one direction when the valve movement quantity does not reach said movement quantity for eliminating the fixation even after the lapse of the predetermined movement control time during the operation for moving the valve in the other direction; and
finishing the fixation avoiding operation after the operations for moving the valve in one direction and in the other direction predetermined times.

10. The valve control method for an internal combustion engine according to claim 9, further comprising the step of:
determining as to whether or not said fixation avoiding operation can eliminate the fixation of the valve, wherein
in said determining step, it is determined that the fixation of the valve is eliminated in the case where the valve movement quantity reaches the movement quantity for eliminating the fixation within a predetermined movement control time after the start of the operation for moving the valve in one direction or the operation for moving the valve in the other direction.

11. The valve control method for an internal combustion engine according to claim 10, further comprising the step of:
prohibiting the valve from being opened/closed during the operation of the internal combustion engine in the case where it is determined that the fixation of the valve is not eliminated.

12. The valve control method for an internal combustion engine according to claim 10, further comprising the step of:
positioning the valve opened/closed position at a predetermined position in the case where it is determined that the fixation of the valve is eliminated, and performing a reference position correcting operation for recognizing the predetermined position as a reference position, at which the valve opening/closing control operation during the operation of the internal combustion engine.

13. The valve control method for an internal combustion engine according to claim 9, further comprising the step of:
determining as to whether or not said fixation avoiding operation can eliminate the fixation of the valve, wherein
the determining step includes the step of determining that the fixation of the valve is not eliminated in the case where the valve movement quantity does not reach the movement quantity for eliminating the fixation more than predetermined times even after a lapse of a predetermined movement control time after the operation for moving the valve in one direction or the operation for moving the valve in the other direction are performed the predetermined times.

14. The valve control method for an internal combustion engine according to claim 13, further comprising the step of:
prohibiting the valve from being opened/closed during the operation of the internal combustion engine in the case where it is determined that the fixation of the valve is not eliminated.

15. The valve control method for an internal combustion engine according to claim 13, further comprising the step of:
positioning a valve opened/closed position at a predetermined position in the case where it is determined that the fixation of the valve is eliminated, and performing a reference position correcting operation for recognizing the predetermined position as a reference position, at which the valve opening/closing control operation is performed during the operation of the internal combustion engine.

16. The valve control device for an internal combustion engine according to claim 9, wherein said fixation avoiding operation is performed while the internal combustion engine stops.

* * * * *